(12) United States Patent
Kim

(10) Patent No.: US 11,351,882 B2
(45) Date of Patent: Jun. 7, 2022

(54) ECO-FRIENDLY VEHICLE AND CHARGING CONTROL METHOD THEREOF

(71) Applicants: HYUNDAI MOTOR COMPANY, Seoul (KR); KIA MOTORS CORPORATION, Seoul (KR)

(72) Inventor: Dokon Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 181 days.

(21) Appl. No.: 16/798,794

(22) Filed: Feb. 24, 2020

(65) Prior Publication Data
US 2021/0031646 A1    Feb. 4, 2021

(30) Foreign Application Priority Data
Aug. 1, 2019 (KR) .................. 10-2019-0093780

(51) Int. Cl.
*B60L 53/62* (2019.01)
*H01M 10/42* (2006.01)
(Continued)

(52) U.S. Cl.
CPC .............. *B60L 53/62* (2019.02); *B60L 53/12* (2019.02); *B60L 58/12* (2019.02); *B60L 58/16* (2019.02); *B60L 58/22* (2019.02); *H01M 10/425* (2013.01); *H01M 10/441* (2013.01); *H02J 7/005* (2020.01); *H02J 7/0014* (2013.01);
(Continued)

(58) Field of Classification Search
CPC .......... B60L 53/62; B60L 53/12; B60L 58/12; B60L 58/16; B60L 58/22; B60L 2240/547; B60L 2240/549; B60L 3/12; H01M 10/425; H01M 10/441; H01M 2010/4271; H01M 2220/20; H02J 7/0014; H02J 7/0048; H02J 7/005; H02J 50/80; H02J 2310/48; H02J 7/0018; H02J 50/10; B60K 6/24; B60K 6/28; B60Y 2200/92; B60Y 2200/90; Y02E 60/10; Y02T 10/70; Y02T 10/7072; Y02T 90/12; Y02T 90/14
See application file for complete search history.

(56) References Cited

U.S. PATENT DOCUMENTS 9,831,689 B2 * 11/2017 Kang .................. H01M 10/441
10,989,761 B2 * 4/2021 Montaru .............. G01R 31/392
(Continued)

FOREIGN PATENT DOCUMENTS

| KR | 2002-0083332 A | 11/2002 |
|---|---|---|
| KR | 10-1175358 B1 | 8/2012 |
| KR | 10-1187448 B1 | 10/2012 |
| KR | 10-1189289 B1 | 10/2012 |

*Primary Examiner* — Nha T Nguyen
(74) *Attorney, Agent, or Firm* — Lempia Summerfield Katz LLC

(57) ABSTRACT

An eco-friendly vehicle using a charging control method improves the wireless charging efficiency and efficiently manages the charge/discharge of a battery of the vehicle. The eco-friendly vehicle includes: a wireless power receiver to wirelessly receive an electric power from an external charging device; a memory to store state information of each of a plurality of battery cells; and a controller to control a charging order of each of the plurality of battery cells by using the state information stored in the memory when an engine of the vehicle is in an off state.

20 Claims, 7 Drawing Sheets

(51) Int. Cl.
*H02J 7/00* (2006.01)
*H02J 50/80* (2016.01)
*B60L 53/12* (2019.01)
*B60L 58/12* (2019.01)
*B60L 58/16* (2019.01)
*B60L 58/22* (2019.01)
*H01M 10/44* (2006.01)
*B60K 6/24* (2007.10)
*B60K 6/28* (2007.10)

(52) U.S. Cl.
CPC ............ *H02J 7/0048* (2020.01); *H02J 50/80* (2016.02); *B60K 6/24* (2013.01); *B60K 6/28* (2013.01); *B60Y 2200/92* (2013.01); *H01M 2010/4271* (2013.01); *H01M 2220/20* (2013.01)

(56) References Cited

U.S. PATENT DOCUMENTS

| | | | |
|---|---|---|---|
| 2012/0109442 A1* | 5/2012 | Kato | B60L 50/16 701/22 |
| 2013/0026989 A1* | 1/2013 | Gibbs | B60L 50/64 320/116 |
| 2014/0009092 A1* | 1/2014 | Ma | B60L 58/22 318/139 |
| 2014/0312848 A1* | 10/2014 | Alexander | G01R 31/392 320/134 |
| 2016/0023558 A1* | 1/2016 | Hika | B60L 53/126 320/108 |
| 2016/0114686 A1* | 4/2016 | Beattie, Jr. | B60L 53/66 320/108 |
| 2017/0038436 A1* | 2/2017 | Montaru | G01R 31/392 |
| 2017/0203660 A1* | 7/2017 | He | B60L 58/15 |

\* cited by examiner

FIG. 5

|  | SOH (%) | THRESHOLD VOLTAGE (V) | SOC (%) | CHARGING PRIORITY |
|---|---|---|---|---|
| CELL BALANCING UNIT #1 | 85 | 0.8 * Vth | 90 | 2 |
| CELL BALANCING UNIT #2 | 100 | 1.0 * Vth | 70 | 3 |
| CELL BALANCING UNIT #3 | 55 | 0.6 * Vth | 95 | 1 |

ECO-FRIENDLY VEHICLE AND CHARGING CONTROL METHOD THEREOF

CROSS-REFERENCE TO RELATED APPLICATION

This application claims priority to and the benefit of Korean Patent Application No. 10-2019-0093780, filed on Aug. 1, 2019, the entire contents of which are incorporated herein by reference.

FIELD

The present disclosure relates to a vehicle, and more particularly, to an eco-friendly vehicle that operates with electric energy supplied by a battery.

BACKGROUND

The statements in this section merely provide background information related to the present disclosure and may not constitute prior art.

As the supply of eco-friendly vehicles increases, many eco-friendly vehicle makers have developed various battery charging methods for the eco-friendly vehicles.

Among battery charging methods of eco-friendly vehicles, wireless charging technology has attracted much attention. Instead of a conventional method of charging a device and an eco-friendly vehicle by a cable, the wireless charging technology is developed for an eco-friendly vehicle. the wireless charging technology wirelessly transmits power in the form of an RF signal to charge a battery of the eco-friendly vehicle.

As a wireless charging technology, a wireless charging system using a magnetic induction phenomenon is used. We have discovered that the magnetic induction method of inducing a current through a magnetic field from one coil to another is sensitive to the distance and relative position between the coils, and the charging efficiency due to external noise is poor.

SUMMARY

The present disclosure improves wireless charging efficiency of an eco-friendly vehicle and also efficiently manages charging/discharging of a battery.

According to an aspect of the present disclosure, an eco-friendly vehicle comprises: a wireless power receiver configured to wirelessly receive electric power from an external charging device; a memory configured to store state information of each of the plurality of battery cells; and a controller configured to control a charging order of the battery cells of the plurality of battery cells using the state information stored in the memory when an engine of the eco-friendly vehicle is in an off state.

In one form, the controller is configured to: set the charging order of the battery cells of the plurality of battery cells based on a state of charge (SOC) of each battery cell, and set, among the plurality of battery cells, a higher priority in the charging order to a battery cell having a lower SOC.

In another form, the eco-friendly vehicle further comprises: a plurality of cell balancing units respectively provided to corresponding battery cells of the plurality of battery cells. In particular, the controller sequentially wakes up cell balancing units among the plurality of cell balancing units based on the charging order of the battery cells of the plurality of battery cells, and controls each battery cell of the plurality of battery cells to be charged based on the charging order.

When charging a battery cell of the plurality of battery cells is completed, the controller stores voltage information of the charged battery cell in the memory.

In other form, the controller receives operation information of the wireless power receiver, and charges another battery cell among the plurality of battery cells by resetting the wireless power receiver when charging of one battery cell among the plurality of battery cells is completed.

In still other form, the controller receives operation information of the wireless power receiver, and initializes the wireless power receiver to a normal state by resetting the wireless power receiver when abnormal operation of the wireless power receiver is detected from the operation information.

In another aspect of the present disclosure, an eco-friendly vehicle comprises: a wireless power receiver configured to wirelessly receive electric power from an external charging device and including a comparator configured to select a frequency of the received electric power; a memory configured to store state information of each battery cell of a plurality of battery cells; and a controller configured to control frequency selection of the comparator and to control a charging order of the battery cells of the plurality of battery cells using the state information stored in the memory when an engine of the eco-friendly vehicle is in an off state.

In another aspect, when the controller controls the charging order of the battery cells of the plurality of battery cells, the controller arranges a higher priority to a battery cell having a lower state of charge (SOC).

In another form, the comparator is configured to select only a frequency band of a voltage greater than a threshold voltage; and the controller is configured to variably apply a magnitude of the threshold voltage based on a state of health (SOH) of each battery cell of the plurality of battery cells.

In another form, when charging a battery cell having 100% SOH among the plurality of battery cells, 100% of a predetermined threshold voltage is applied to the comparator; and when the SOH of battery cells among the plurality of battery cells is less than 100%, a ratio of less than 100% proportional to the SOH of the respective battery cells is applied to the comparator.

The eco-friendly vehicle may further comprises: a plurality of cell balancing units respectively provided to corresponding battery cells of the plurality of battery cells. In particular, the controller sequentially wakes up cell balancing units among the plurality of cell balancing units based on the charging order of the battery cells of the plurality of battery cells, and controls each battery cell of the plurality of battery cells to be charged based on the charging order.

In one form, when charging a battery cell of the plurality of battery cells is completed, the controller stores voltage information of the charged battery cell in the memory.

The controller may be configured to receive operation information of the wireless power receiver, and to charge another battery cell among the plurality of battery cells by resetting the wireless power receiver when charging one battery cell of the plurality of battery cells is completed.

In another form, the controller may be configured to receive operation information of the wireless power receiver, and to initialize the wireless power receiver to a normal state by resetting the wireless power receiver when abnormal operation of the wireless power receiver is detected from the operation information.

In other aspect of the present disclosure, a charging control method of an eco-friendly vehicle is provides, where the vehicle comprises: a wireless power receiver to wirelessly receive power from an external charging device and including a comparator for selecting a frequency of the received power; a memory to store state information of each battery cell of a plurality of battery cells; and a controller to control a charging order of the battery cells of the plurality of battery cells. In particular, the method comprises: controlling, by the controller, frequency selection of the comparator; and controlling, by the controller, a charging order of the battery cells of the plurality of battery cells using the state information stored in the memory when an engine of the vehicle is in an off state.

In controlling a charging order of the battery cells of the plurality of battery cells, a higher priority of charging is assigned to a battery cell having a lower state of charge (SOC).

In another form, the charging control method further includes: selecting, by the comparator, only a frequency band of a voltage greater than a threshold voltage; and variably applying, by the controller, a magnitude of the threshold voltage based on a state of health (SOH) of each battery cell of the plurality of battery cells.

When charging a battery cell having 100% SOH among the plurality of battery cells, 100% of a predetermined threshold voltage is applied to the comparator; and when the SOH of a battery cell among the plurality of battery cells is less than 100%, a ratio of less than 100% proportional to the SOH of the battery cell is applied to the comparator.

The charging control method further includes, when charging one battery cell of the plurality of battery cells is completed, storing, by the controller, voltage information of the charged battery cell in the memory.

The charging control method may include receiving operation information of the wireless power receiver, and charging another battery cell among the plurality of battery cells by resetting the wireless power receiver when charging one battery cell of the plurality of battery cells is completed.

The charging control method may include receiving operation information of the wireless power receiver, and initializing the wireless power receiver to a normal state by resetting the wireless power receiver when an abnormal operation of the wireless power receiver is detected from the operation information.

One aspect of the present disclosure is to improve the wireless charging efficiency of the eco-friendly vehicle and to efficiently manage the charge/discharge of the battery.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is a view showing the determination of the battery cell charging order of the eco-friendly vehicle.

Figure 1:
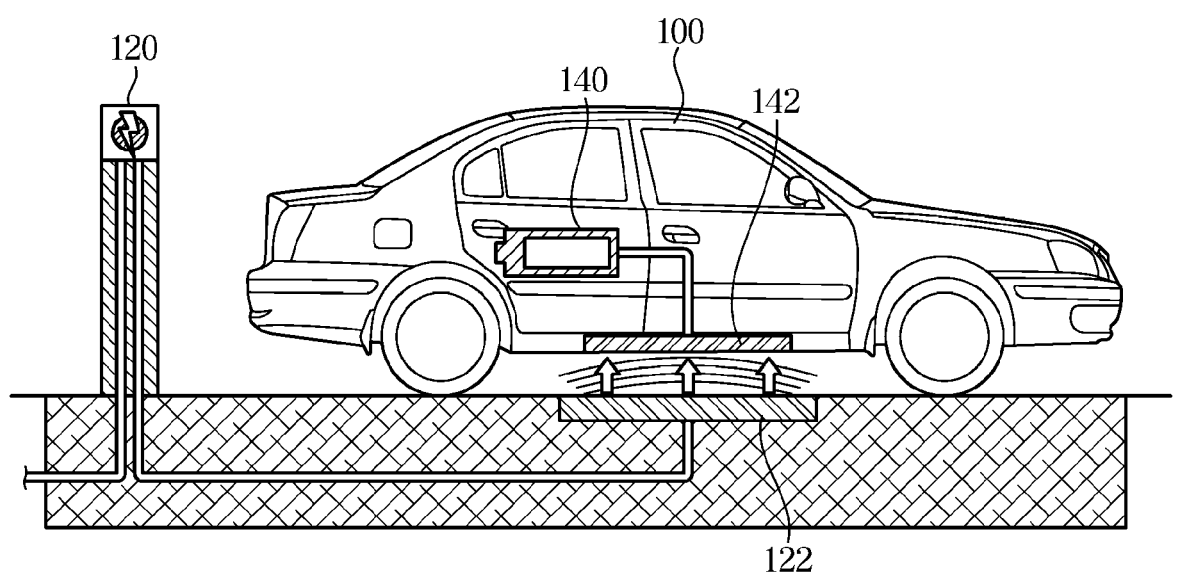
FIG. 1 is a view showing a wireless charging system of an eco-friendly vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a view showing a wireless charging system of an eco-friendly vehicle according to one form of the present disclosure.

The wireless charging device 120 performs power conversion, charging control, charging, and the like. The wireless charging device 120 includes a wireless power transmitter 122, which is embedded below the ground. The wireless charging device 120 wirelessly communicates with the eco-friendly vehicle 100 for charging control and charging.

The eco-friendly vehicle 100 according to one form of the present disclosure is provided with a battery 140 and a wireless power receiver 142.

The battery 140 is charged by the power received through the wireless power receiver 142.

The wireless power receiver 142 allows the battery 140 to be charged, by receiving the wireless power transmitted in the form of an RF signal through the wireless power transmitter 122 of the wireless charging device 120 to deliver to the battery 140.

Figure 2:
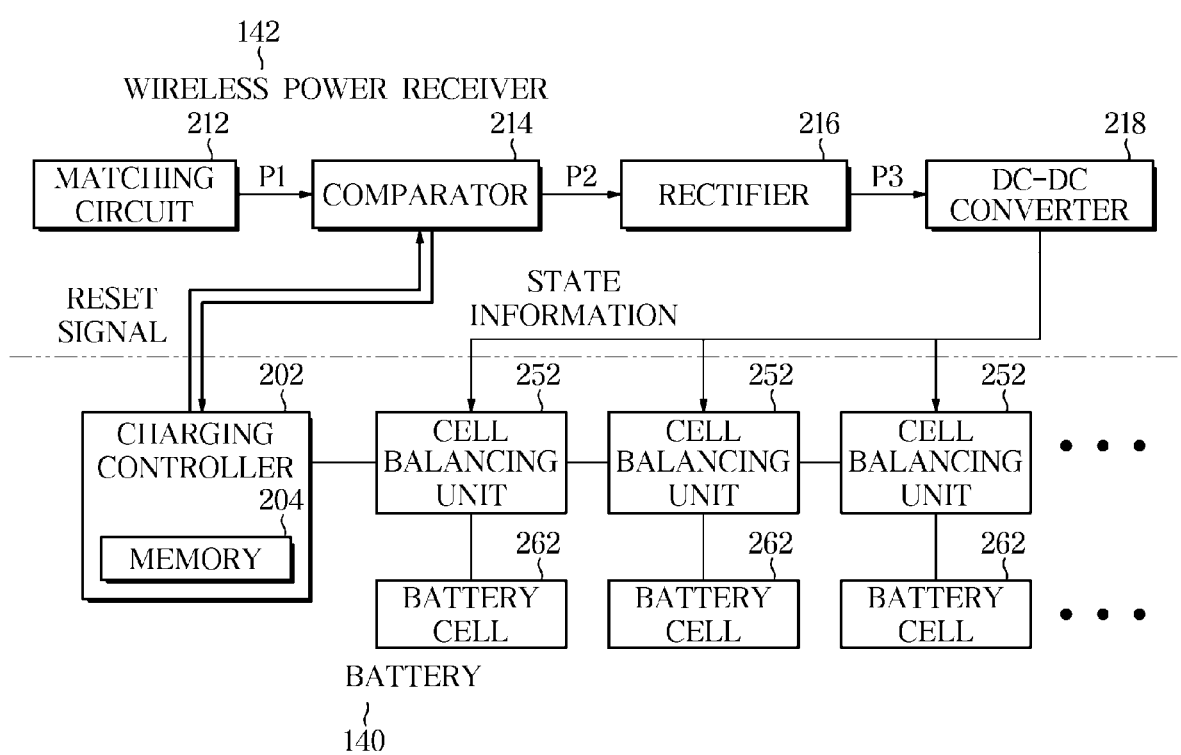
FIG. 2 is a view showing a wireless power receiver and a battery of an eco-friendly vehicle.

FIG. 2 is a view showing a wireless power receiver and a battery of an eco-friendly vehicle according to one form of the present disclosure.

The wireless power receiver 142 includes a matching circuit 212, a comparator 214, a rectifier 216, and a DC-DC converter 218.

The matching circuit 212 is provided to prevent impedance matching and power loss between the wireless power transmitter 122 of the external wireless charging device 120 and the wireless power receiver 142 of the eco-friendly vehicle 100. In FIG. 2, 'P1' is an output voltage of the matching circuit 212.

The comparator 214 is provided to receive the output voltage P1 of the matching circuit 212 to increase the voltage and remove noise. The configuration and operation of the comparator 214 will be described in more detail with reference to FIGS. 3 to 5 below. In FIG. 2, 'P2' is an output voltage of the comparator 214.

The rectifier 216 receives the output voltage P2 of the comparator 214 and rectifies the AC voltage into a DC voltage. In FIG. 2, 'P3' is an output voltage of the rectifier 216.

The DC-DC converter 218 converts the output voltage P3 of the rectifier 216 into a DC voltage suitable for charging the battery 140. The output voltage of the DC-DC converter 218 is supplied to the battery 140 and used to charge the battery 140.

The battery 140 includes a charging controller 202, a plurality of cell balancing units 252, and a plurality of battery cells 262.

The charging controller 202 controls the overall charging of the battery 140. To this end, the state information of each of the plurality of battery cells 262 is received from the plurality of cell balancing units 252 and stored in the memory 204.

In addition, the charging controller 202 receives the operation information of the comparator 214 from the comparator 214 of the wireless power receiver 142, generates a reset signal if desired, and hardly resets the comparator 214. For example, when charging of one battery cell 262 is completed, the charging controller 202 may reset the comparator 214 to charge the other battery cell 262. In addition, when the comparator 214 does not operate normally, the charging controller 202 may generate a reset signal to hard reset the comparator 214 and then attempt to charge again.

By receiving state information of each of the plurality of battery cells 262 and storing them in the memory 204, in the future, even in the engine off state of the eco-friendly vehicle 100, each of the plurality of battery cells 262 may be evenly charged by checking the state of each of the plurality of battery cells 262 (cell balancing). The plurality of cell balancing units 252 obtains state information of each of the plurality of battery cells 262 and transmits the state information to the charging controller 202, and performs cell balancing of each of the plurality of battery cells 262 under the control of the charging controller 202.

The meaning of cell balancing is to manage the charging and discharging of the plurality of battery cells 206 evenly charging/discharging all of the plurality of battery cells 262, if possible, without biasing any one battery cell.

Each of the plurality of battery cells 262 is charged and managed through each of the plurality of cell balancing units 252. Each charge of the plurality of battery cells 262 is performed until the voltage of each of the plurality of battery cells 262 reaches a second reference voltage. The second reference voltage may be set differently for each of the plurality of battery cells 262. For example, since chargeable voltages may be different from each other according to a state of health (SOH) and a state of charge (SOC) of each of the plurality of battery cells 262, the charging is performed by varying the second reference voltage of each of the plurality of battery cells.

Figure 3A:
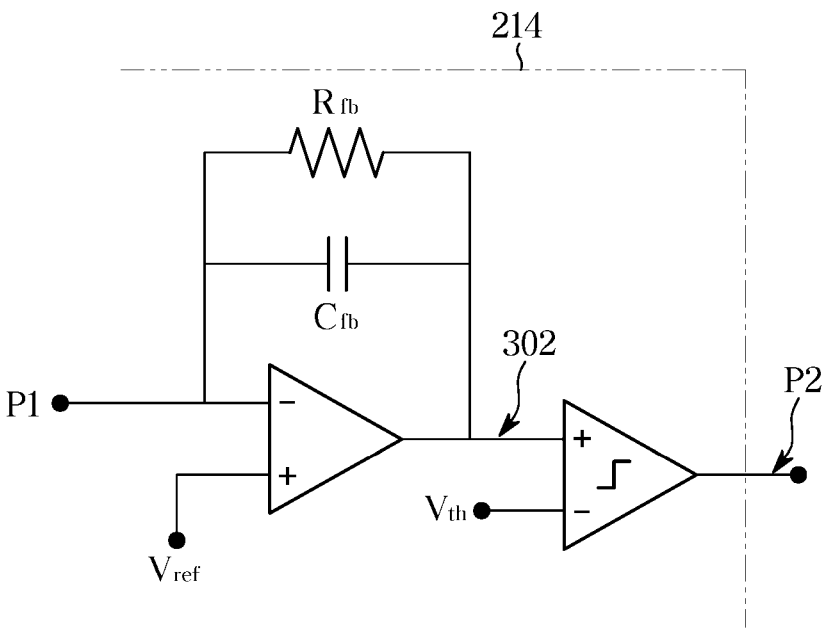
FIGS. 3A, 3B and 3C are views showing a comparator constituting a wireless charging receiver of an eco-friendly vehicle and voltages of the comparator.
Figure 3B:
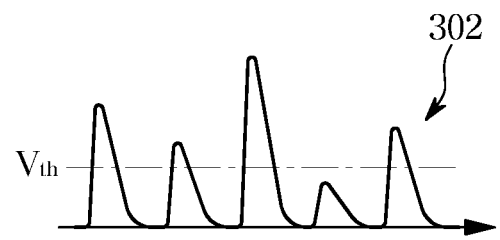
Figure 3C:
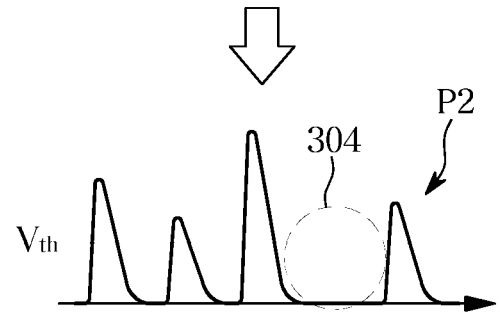

FIGS. 3A, 3B and 3C are views showing a comparator constituting a wireless charging receiver of an eco-friendly vehicle and voltages of the comparator according to one form of the present disclosure.

As shown in FIG. 3A, the comparator 214 receives P1, which is an output voltage of the matching circuit 212, and compares it with the first reference voltage Vref, and then amplifies the resistor Rfb and the capacitor Cfb when the input voltage P1 is smaller than the first reference voltage Vref.

By comparison with the threshold voltage Vth, the voltage 302 amplified through the resistor Rfb and the capacitor Cfb is only output as the output voltage P2 when compared with the threshold voltage, and no voltage less than the threshold voltage Vth is output.

FIG. 3B shows a voltage 302 amplified through the resistor Rfb and the capacitor Cfb. As can be seen in FIG. 3C, the voltage 304 smaller than the threshold voltage Vth is not output. Due to this action, noise components (parts smaller than Vth) incorporated in the input power of the comparator 214 can be eliminated.

Figure 4A:
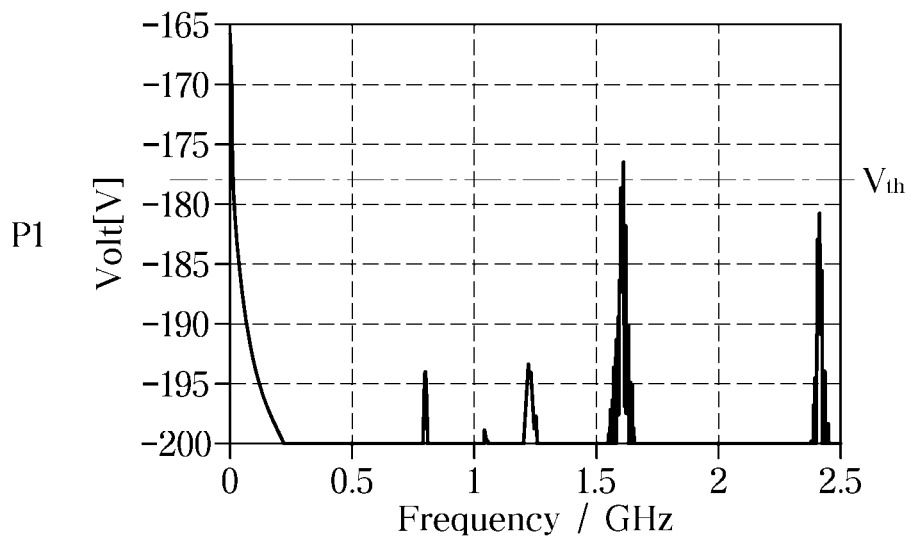
FIGS. 4A, 4B and 4C are views showing the voltage characteristics of the wireless power receiver.
Figure 4B:
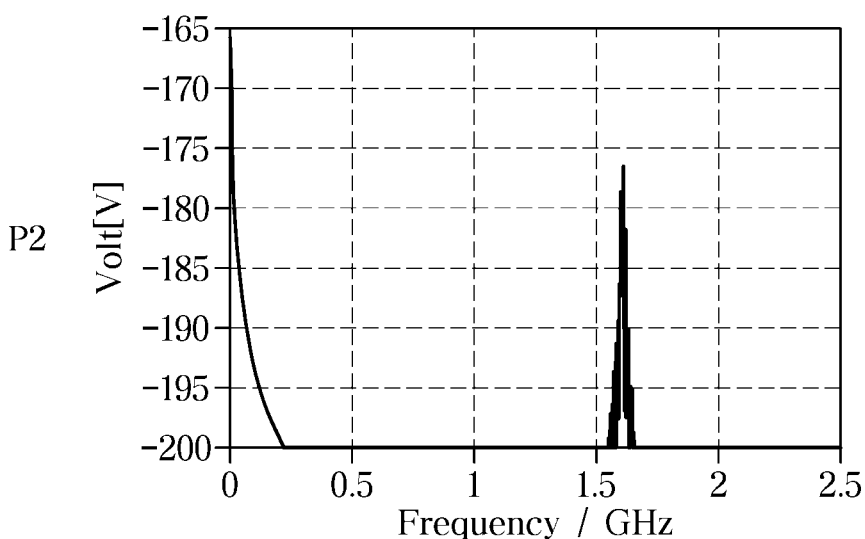
Figure 4C:
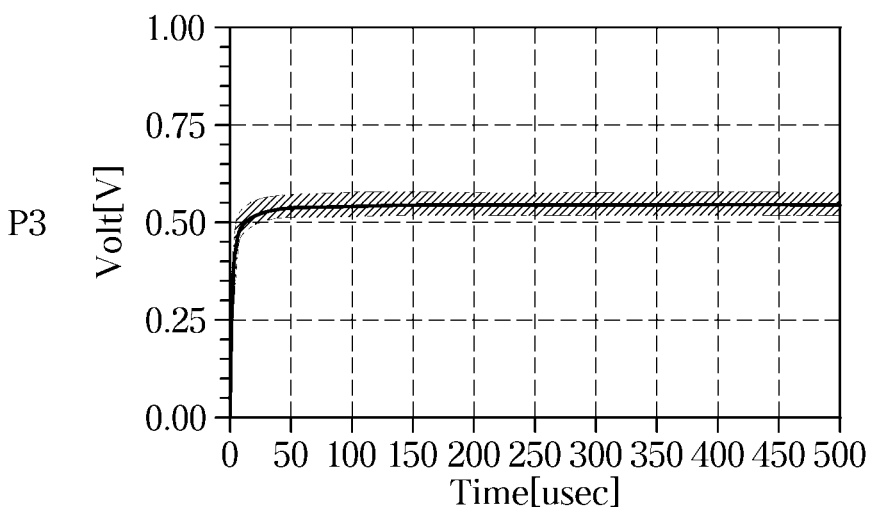

FIGS. 4A, 4B and 4C are views showing the voltage characteristics of the wireless power receiver according to one form of the present disclosure.

FIG. 4A is a diagram illustrating an output voltage P1 of the matching circuit 212. As shown in FIG. 4A, the voltage P1 output from the matching circuit 212 and input to the comparing unit 214 may have voltage characteristics having different magnitudes according to frequency bands. In FIG. 4A, it can be seen that the voltage P1 includes noise components having a small voltage.

FIG. 4B is a view illustrating the output voltage P2 of the comparator 214. As shown in FIG. 4B, small noise components are removed by the action of the threshold voltage Vth.

FIG. 4C is a view illustrating the output voltage P3 of the rectifier 216. As shown in FIG. 4C, by rectifying after removing the noise component, a good rectified voltage can be obtained.

FIG. 5 is a view showing the determination of the battery cell charging order of the eco-friendly vehicle according to one form of the present disclosure.

As illustrated in FIG. 5, the state of health (SOH) of each of the plurality of battery cells 262 is predicted from the impedance change according to the temperature and the current density of each of the plurality of battery cells 262 by applying the current value and the voltage value obtained at the discharge of each of the plurality of battery cells.

Accordingly, the SOH may be predicted for each of the plurality of battery cells 262, and the first reference voltage Vth of the comparator 214 is variably applied to each of the plurality of battery cells 262 by using the predicted SOH. The reason for variably applying the first reference voltage Vth of the comparator 214 is that it is difficult to fully charge the battery cell 262 having a short state of health to the second reference voltage and it may take a long time to charge. To solve this problem, the first reference voltage Vth is variably applied by predicting the SOH values of each of the plurality of battery cells 262.

For example, as shown in FIG. 5, if the SOH of a specific battery cell 262 is 80 to 100%, the first reference voltage Vth of the comparator 214 when charging the corresponding battery cell 262 is 1.0.*Vth is applied as it is. If the SOH of the specific battery cell 262 is 60 to 80%, the first reference voltage Vth of the comparator 214 when charging the battery cell is applied only the 80% of 0.8*Vth. If the SOH of the specific battery cell 262 is 40 to 60%, the first reference voltage Vth of the comparator 214 when charging the battery cell is applied only the 60% of 0.6*Vth. If the SOH of the specific battery cell 262 is 20 to 40%, the first reference voltage Vth of the comparator 214 when charging the battery cell is applied only the 40% of 0.4*Vth.

In this case, as shown in FIG. 5, the charging priority of each of the plurality of battery cells 262 gives higher priority to a battery cell 262 having a small SOH or a battery cell having a large ratio (%) of the first reference voltage Vth actually applied to the comparator 214.

Figure 6A:
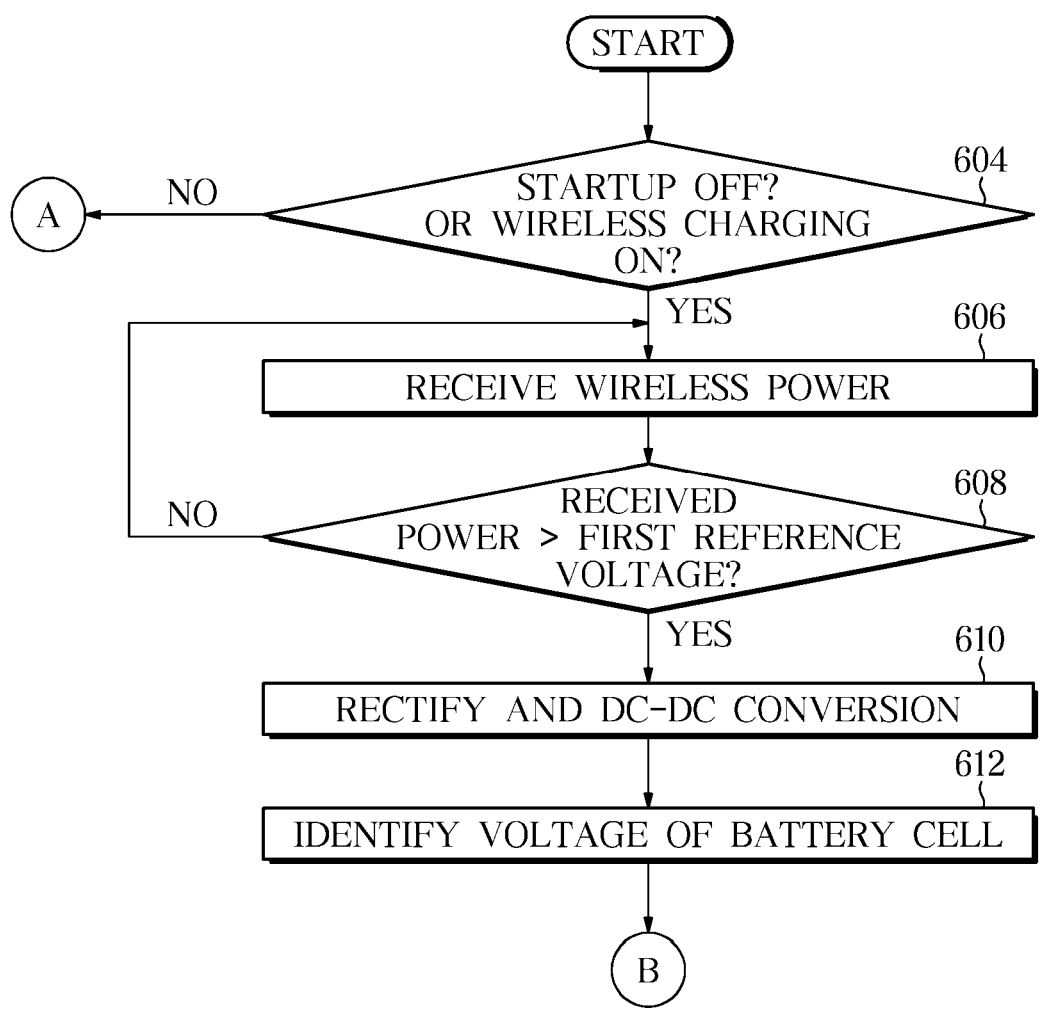
FIGS. 6A and 6B are flowcharts respectively showing a battery charging method of an eco-friendly vehicle.
Figure 6B:
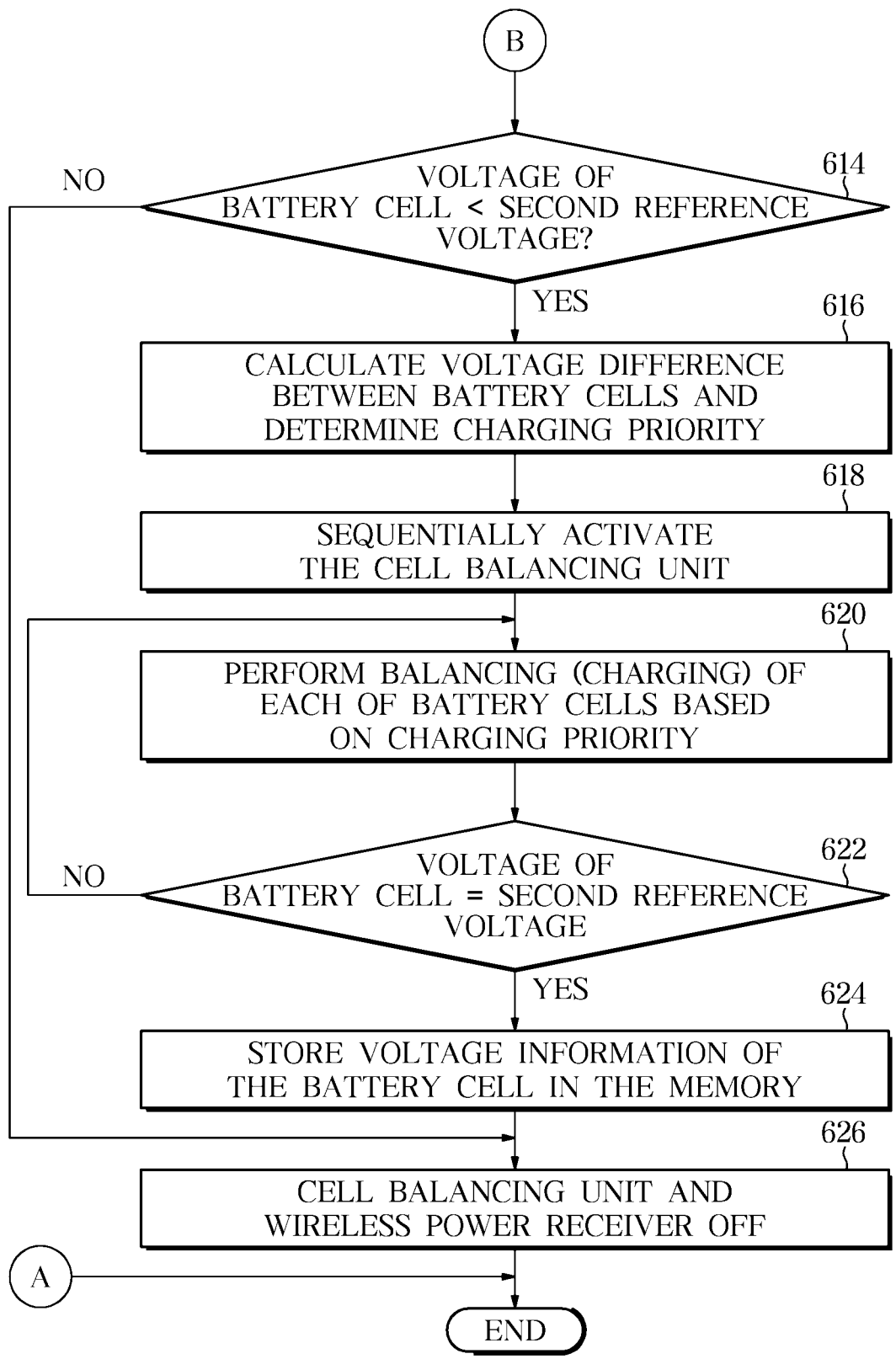

FIGS. 6A and 6B are flowcharts illustrating a battery charging method of an eco-friendly vehicle according to one form of the present disclosure.

It is identified whether the wireless charging is activated while the engine of the eco-friendly vehicle 100 is turned off (604). Herein, activation of the wireless charging includes activation of the external wireless charging device 120 and the wireless charging receiver 142 and the battery 140 of the eco-friendly vehicle 100.

If wireless charging is activated while the engine of the eco-friendly vehicle 100 is turned off, the charging controller 202 receives wireless power through the wireless power receiver 142 (606). If the received power is greater than the first reference voltage Vref (YES in 608), the charging controller 202 rectifies the received power and then performs DC-DC conversion (610). Next, the charging controller 202 identifies the current charging voltage of each of the plurality of battery cells 262 (612).

In this case, when the eco-friendly vehicle 100 is in the off state and it is difficult to directly measure the charging voltage of each of the plurality of battery cells 262, the charging controller 202 may identify the charging voltage of each of the plurality of battery cells 262 from the state information of each of the plurality of battery cells 262 stored in the memory 204. That is, the eco-friendly vehicle 100 may determine the charging order by checking the state of charge of each of the plurality of battery cells 262 even in the startup-off state by referring to the state information stored in the memory 204.

If the charging voltage of each of the plurality of battery cells 262 is less than the second reference voltage (YES in 614), The charging controller 202 calculates a voltage difference between the plurality of battery cells 262, and determines the charging priority of each of the plurality of battery cells 262 based on the calculated voltage difference (616). If the charging voltage of each of the plurality of battery cells 262 is greater than or equal to the second reference voltage (No in 614), the charging controller 202 proceeds to step 626 to deactivate the cell balancing unit 252 and the wireless power receiver 142.

When the charging priority of each of the plurality of battery cells 262 is determined, the charging controller 202 sequentially activates the plurality of cell balancing units 252 to match the priority (618). Charging each of the plurality of battery cells 262 is possible by activating the corresponding cell balancing unit 252.

The charging controller 202 performs balancing (charging) of each of the plurality of battery cells 262 based on the charging priority determined above (620). Herein, the charging of each of the plurality of battery cells 262 is referred to as 'balancing', this is because the charging and discharging of the plurality of battery cells 206 are managed so that all of the plurality of battery cells 262 are evenly charged/discharged, if possible, without biasing any one battery cell.

If the voltage of each of the plurality of battery cells 262 reaches the desired second reference voltage (YES in 622), the charging controller 202 stores the voltage information of the battery cell 262 in which the charging is completed, in the memory 204 (624).

Through this process, when the balancing (charging) of each of the plurality of battery cells 262 is completed in the order of high priority, the charging controller 202 deactivates the plurality of cell balancing units 252 and the wireless power receiver 142 to complete charging of the battery 140 (626).

The disclosed forms is merely illustrative of the technical idea, and those skilled in the art will appreciate that various modifications, changes, and substitutions may be made without departing from the present disclosure. Therefore, the exemplary forms disclosed above and the accompanying drawings are not intended to limit the technical idea, but to describe the technical spirit, and the scope of the technical idea is not limited by the forms and the accompanying drawings.

What is claimed is:
1. An eco-friendly vehicle comprising:
a wireless power receiver configured to wirelessly receive electric power from an external charging device;
a memory configured to store state information of each battery cell of a plurality of battery cells;
a plurality of cell balancing units respectively provided to corresponding battery cells of the plurality of battery cells; and
a controller configured to:
control a charging order of the battery cells of the plurality of battery cells using the state information stored in the memory when the eco-friendly vehicle is in an off state,
sequentially wake up cell balancing units among the plurality of cell balancing units based on the charging order of the battery cells of the plurality of battery cells, and
control each battery cell of the plurality of battery cells to be charged based on the charging order.
2. The eco-friendly vehicle of claim 1, wherein
the controller is configured to:
set the charging order of the battery cells of the plurality of battery cells based on a state of charge (SOC) of each battery cell, and
set, among the plurality of battery cells, a higher priority in the charging order to a battery cell having a lower SOC.
3. The eco-friendly vehicle of claim 1, wherein
when charging a battery cell of the plurality of battery cells is completed, the controller is configured to store voltage information of the charged battery cell in the memory.
4. The eco-friendly vehicle of claim 1, wherein
the controller is configured to:
receive operation information of the wireless power receiver, and
charge another battery cell among the plurality of battery cells by resetting the wireless power receiver when charging of one battery cell among the plurality of battery cells is completed.
5. The eco-friendly vehicle of claim 1, wherein
the controller is configured to:
receive operation information of the wireless power receiver, and
initialize the wireless power receiver to a normal state by resetting the wireless power receiver when abnormal operation of the wireless power receiver is detected from the operation information.
6. An eco-friendly vehicle, comprising:
a wireless power receiver configured to wirelessly receive electric power from an external charging device and including a comparator configured to select a frequency of the received electric power;
a memory configured to store state information of each battery cell of a plurality of battery cells; and
a controller configured to control frequency selection of the comparator and to control a charging order of the battery cells of the plurality of battery cells using the state information stored in the memory when the eco-friendly vehicle is in an off state.
7. The eco-friendly vehicle of claim 6, wherein when the controller controls the charging order of the battery cells of the plurality of battery cells, the controller is configured to arrange a higher priority to a battery cell having a lower state of charge (SOC).
8. The eco-friendly vehicle of claim 7, wherein:
the comparator is configured to select only a frequency band of a voltage greater than a threshold voltage; and
the controller is configured to variably apply a magnitude of the threshold voltage based on a state of health (SOH) of each battery cell of the plurality of battery cells.

9. The eco-friendly vehicle of claim 8, wherein:
when charging a battery cell having 100% SOH among the plurality of battery cells, 100% of a predetermined threshold voltage is applied to the comparator; and
when the SOH of battery cells among the plurality of battery cells is less than 100%, a ratio of less than 100% proportional to the SOH of the respective battery cells is applied to the comparator.

10. The eco-friendly vehicle of claim 6, further comprising: a plurality of cell balancing units respectively provided to corresponding battery cells of the plurality of battery cells,
wherein the controller is configured to:
sequentially wake up cell balancing units among the plurality of cell balancing units based on the charging order of the battery cells of the plurality of battery cells, and
control each battery cell of the plurality of battery cells to be charged based on the charging order.

11. The eco-friendly vehicle of claim 10, wherein
when charging a battery cell of the plurality of battery cells is completed, the controller is configured to update information of the memory with voltage information of the charged battery cell.

12. The eco-friendly vehicle of claim 6, wherein
the controller is configured to:
receive operation information of the wireless power receiver, and
charge another battery cell among the plurality of battery cells by resetting the wireless power receiver when charging one battery cell of the plurality of battery cells is completed.

13. The eco-friendly vehicle of claim 6, wherein
the controller is configured to:
receive operation information of the wireless power receiver, and
initialize the wireless power receiver to a normal state by resetting the wireless power receiver when abnormal operation of the wireless power receiver is detected from the operation information.

14. A charging control method of an eco-friendly vehicle, where the eco-friendly vehicle includes: a wireless power receiver to wirelessly receive power from an external charging device and including a comparator for selecting a frequency of the received power; a memory to store state information of each battery cell of a plurality of battery cells; and a controller to control a charging order of the battery cells of the plurality of battery cells, the method comprising:
controlling, by the controller, frequency selection of the comparator; and
controlling, by the controller, a charging order of each battery cell of the plurality of battery cells using the state information stored in the memory when an engine of the eco-friendly vehicle is in an off state.

15. The method of claim 14, wherein
in controlling a charging order of the battery cells of the plurality of battery cells, a higher priority of charging is assigned to a battery cell having a lower state of charge (SOC).

16. The method of claim 15, further comprising:
selecting, by the comparator, only a frequency band of a voltage greater than a threshold voltage; and
variably applying a magnitude of the threshold voltage, by the controller, based on a state of health (SOH) of each battery cell of the plurality of battery cells.

17. The method of claim 16, wherein
when charging a battery cell having 100% SOH among the plurality of battery cells, 100% of a predetermined threshold voltage is applied to the comparator; and
when the SOH of a battery cell among the plurality of battery cells is less than 100%, a ratio of less than 100% proportional to the SOH of the battery cell is applied to the comparator.

18. The method of claim 14, further comprising:
updating, by the controller, the state information of the memory with voltage information of a battery cell of the plurality of battery cells when the battery cell is fully charged.

19. The method of claim 14, comprising:
receiving, by the controller, operation information of the wireless power receiver; and
charging, by the controller, another battery cell among the plurality of battery cells by resetting the wireless power receiver when charging of one battery cell of the plurality of battery cells is completed.

20. The method of claim 14, comprising:
receiving, by the controller, operation information of the wireless power receiver; and
initializing, by the controller, the wireless power receiver to a normal state by resetting the wireless power receiver when an abnormal operation of the wireless power receiver is detected from the operation information.

* * * * *